United States Patent [19]

Miyata et al.

[11] Patent Number: 4,612,234
[45] Date of Patent: Sep. 16, 1986

[54] ANTI-REFLECTION COATING FILM SUITABLE FOR APPLICATION ON OPTICS MADE OF MIXED CRYSTALS OF THALLIUM IODIDE AND THALLIUM BROMIDE

[75] Inventors: Takeo Miyata; Takuhiro Ono, both of Zama; Takashi Iwabuchi, Sagamihara, all of Japan

[73] Assignee: Matsushita Electric Industrial Co., Ltd., Japan

[21] Appl. No.: 574,284

[22] Filed: Jan. 26, 1984

[30] Foreign Application Priority Data

Jan. 27, 1983 [JP] Japan ................................ 58-11768

[51] Int. Cl.⁴ ........................... B32B 7/00; G02B 5/26
[52] U.S. Cl. ..................................... 428/215; 350/164; 350/165; 428/688; 428/696; 428/699
[58] Field of Search ................ 350/1.3, 164, 165, 166, 350/1.6; 428/215, 688, 696, 699

[56] References Cited

U.S. PATENT DOCUMENTS

| | | | |
|---|---|---|---|
| 3,421,811 | 10/1967 | Edwards et al. | 350/1 |
| 3,463,574 | 6/1967 | Bastien et al. | 350/164 |
| 3,883,214 | 3/1975 | Hoffman | 350/1 |
| 3,934,961 | 1/1976 | Itoh et al. | 350/164 |
| 4,075,385 | 2/1978 | Baer et al. | 428/215 |
| 4,436,363 | 3/1984 | Steinbruegge et al. | 350/1.6 |
| 4,533,593 | 8/1985 | Miyata et al. | 428/215 |

Primary Examiner—George F. Lesmes
Assistant Examiner—William M. Atkinson
Attorney, Agent, or Firm—Lowe, Price, Leblanc, Becker & Shur

[57] ABSTRACT

An anti-reflection coating film is disclosed which has a three-layer structure and is adapted to be deposited on a substrate made of a mixed crystal of thallium iodide and thallium bromide. The structure comprises a first arsenic triselenide layer, a second lead fluoride layer and a third arsenic triselenide layer for protection of the second layer.

4 Claims, 7 Drawing Figures

ANTI-REFLECTION COATING FILM SUITABLE FOR APPLICATION ON OPTICS MADE OF MIXED CRYSTALS OF THALLIUM IODIDE AND THALLIUM BROMIDE

BACKGROUND OF THE INVENTION

1. Field of the Invention

This invention relates to the reduction of reflection loss from transparent optics of IR optical systems or instruments and more particularly, to anti-reflection coatings which are particularly effective when applied to mixed crystals of thallium iodide and thallium bromide in order to give transparent optics, such as windows, lenses and optical fibers, of IR optical systems.

2. Description of the Prior Art

A mixed crystal of thallium iodide (TlI) and thallium bromide (TlBr) which is usually called KRS-5, and hereinafter referred to as such, has a refractive index of as high as 2.37 at a wavelength of 10.6 microns. This results in a reflection loss of about 28% at both end surfaces of transparent optics made of the mixed crystal. In order to reduce the loss, it is desirable to coat an anti-reflection film at each end surface of the optical part. However, no technique of providing an anti-reflection coating on the KRS-5 material has been established yet.

In recent years, the KRS-5 material has been reduced to practice as an optical fiber for carbon dioxide laser scalpels. There is a high demand of an anti-reflection coating or film for improvement of the optical transmission.

The anti-reflection film which is to be applied to the optical fiber at opposite end surfaces thereof is required to have a much higher laser irradiation damage threshold level than that of an ordinary window or lens for IR rays because the carbon dioxide laser beam is used. With the optical fiber, a laser beam is ordinarily focussed and passed to the optical fiber through one end surface thereof, so that a power density on the end surface becomes greater by about two digits than that of ordinary laser optics. For instance, when a laser beam system is operated at an output power of 50 W, a power density at the incident surface of an optical fiber reaches as high as 50 W/cm$^2$. Accordingly, the anti-reflection coating on each side of the optical fiber is required to have not only high water-proof or moisture-proof properties and good adherence, but also an extremely high laser irradiation damage threshold.

In order to improve the threshold level, it is necessary to provide an anti-reflection film having a laser absorptance which is as small as possible.

Optically transparent optics for carbon dioxide laser are conventionally made of zinc selenide (ZnSe), gallium arsenide (GaAs), potassium chloride (KCl) and the like. Anti-reflection coatings or films for these materials have been proposed including those of single-layer, double-layer and three-layer structures. Anti-reflection films having a multi-layer structure having four or more superposed layers therein may be formed. However, such a multi-layer structure has disadvantages in that formation of the multi-layer structure by vacuum deposition becomes more complicated and that absorption of the laser beam increases with an increase of the layer thickness. Accordingly, the anti-reflection film is usually limited to those consisting of three layers at most.

An anti-reflection coating of a single-layer structure can be most easily formed. According to the optical theory, when a film material whose refractive index, n, is equal to a square root of a refractive index, $\sqrt{n_s}$, of a material of substrate is vacuum deposited on a substrate in an optical thickness, nd, which satisfies nd=$\lambda$/4, e.g. when $\lambda$=10.6 microns, nd=2.65 microns, the reflectance becomes zero. Thus, an ideal anit-reflection film of a single layer is obtained. Only a limited number of materials are known which satisfy the above requirement. Materials which have a refractive index, n, near the square root of a refractive index, $\sqrt{n_s}$, of the KRS-5 material, i.e. $\sqrt{n_s}=\sqrt{2.37}=1.54$, are indicated in Table 1 below along with reflectance, absorptance, and waterproof characteristics.

TABLE 1

|  | n (10.6 microns) | Reflectance per Film (calculated) | Absorptance per Film (calculated) | Water Proof |
|---|---|---|---|---|
| BaF$_2$ | 1.39 | 1% | 0.3% | poor |
| ThF$_4$ | 1.41 | 0.8% | 0.6% | good |
| PbF$_2$ | 1.67 | 0.7% | 0.05 | poor |

As will be seen from the above table, the reflectance cannot be zero in the case of these single-layer anti-reflection films, which have a reflectance of about 1%. With ThF$_4$, its waterproof is excellent but it has the drawback of the high absorptance. PbF$_2$ has a small absorptance but is poor in waterproof. That is, the vacuum-deposited PbF$_2$ film is not resistant to water. When the layer contacts with water on the surface thereof by accident, it is readily cracked with an attendant increase of light scattering.

In the case of the double-layer structure, a combination of two dielectric materials which satisfy Schuster's equation concerning the double-layer structure will theoretically permit the reflectance to be zero. Examples of such a combination are indicated in Table 2 below.

TABLE 2

|  | Reflectance per Film (calculated) | Absorptance per Film | Water Proof |
|---|---|---|---|
| BaF$_2$/ZnSe | 0% | 0.2% | moderate |
| ThF$_4$/ZnS | 0% | 0.4% | good |
| ZnS/Ge | 0% | 0.19% | moderate |

As will be seen from the above table, the double-layer films have theoretically a reflectance of zero but have disadvantageously large absorptances.

SUMMARY OF THE INVENTION

It is accordingly an object of the present invention to provide an anti-reflection film or coating for the KRS-5 material which overcomes the drawbacks of the known anti-reflection films.

It is another object of the invention to provide an anti-reflection film of the three-layer structure which has an extremely high laser irradiation damage threshold level with minimum laser absorptance.

It is a further object of the invention to provide such an anti-reflection film as mentioned above which is also excellent in waterproof.

In order to achieve the above objects, there is provided, according to the present invention, an anti-reflection film which is adapted to be deposited on the surfaces of an infrared ray transmissive substrate of a mixed crystal of thallium iodide and thallium bromide through which a light beam is passed, the anti-reflection film comprising, deposited on the surfaces, a first arsenic triselenide layer, a second lead fluoride layer and a third arsenic triselenide layer for protection of the second layer, arranged on each surface in this order.

Preferably, the optical thicknesses of the first through third layers are determined to be in ranges of 2.398 to 2.650 microns, 1.633 to 1.805 microns, and 0.464 to 0.513 microns, respectively.

BRIEF DESCIPTION OF THE DRAWINGS

Figure 6:
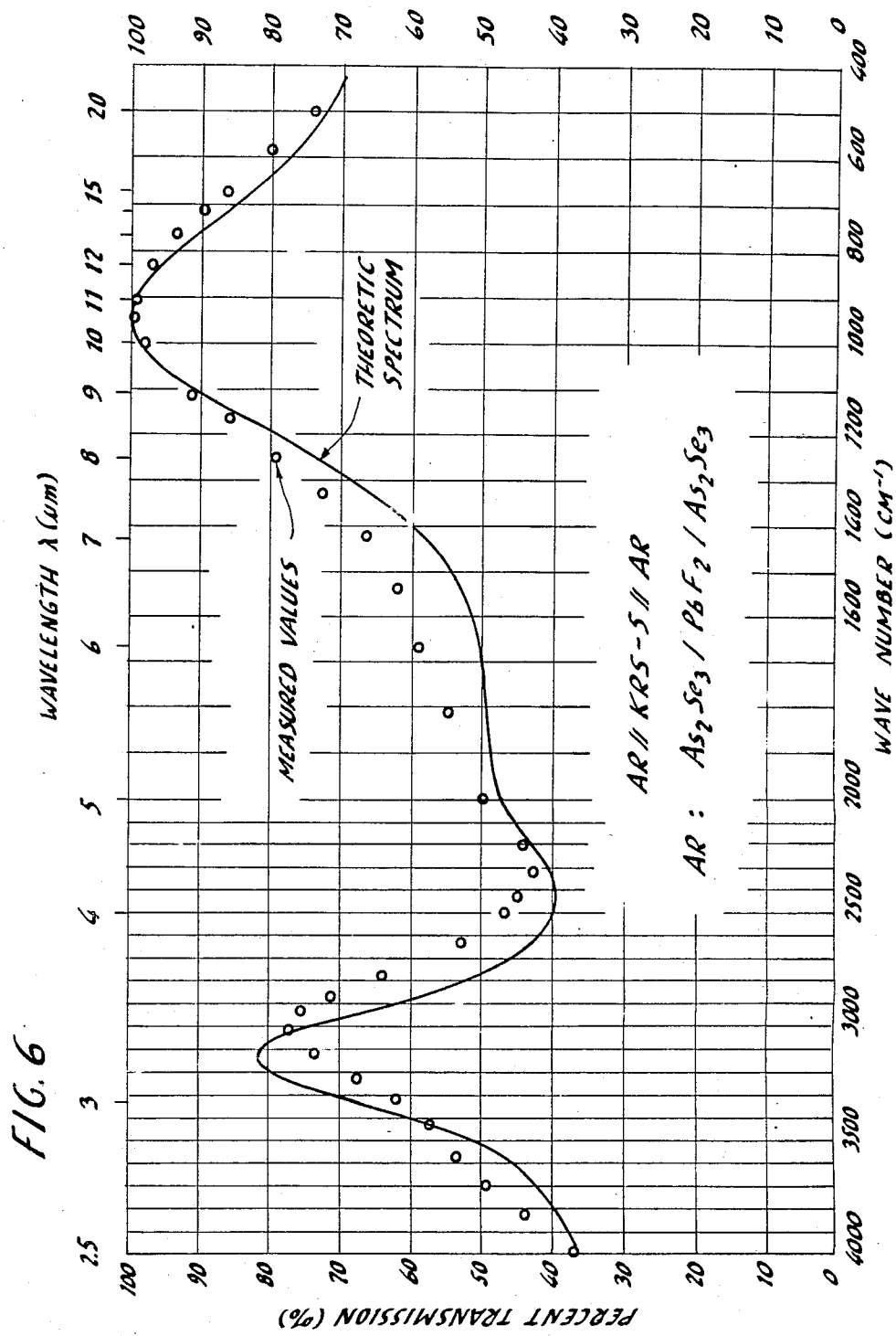
Figure 7:
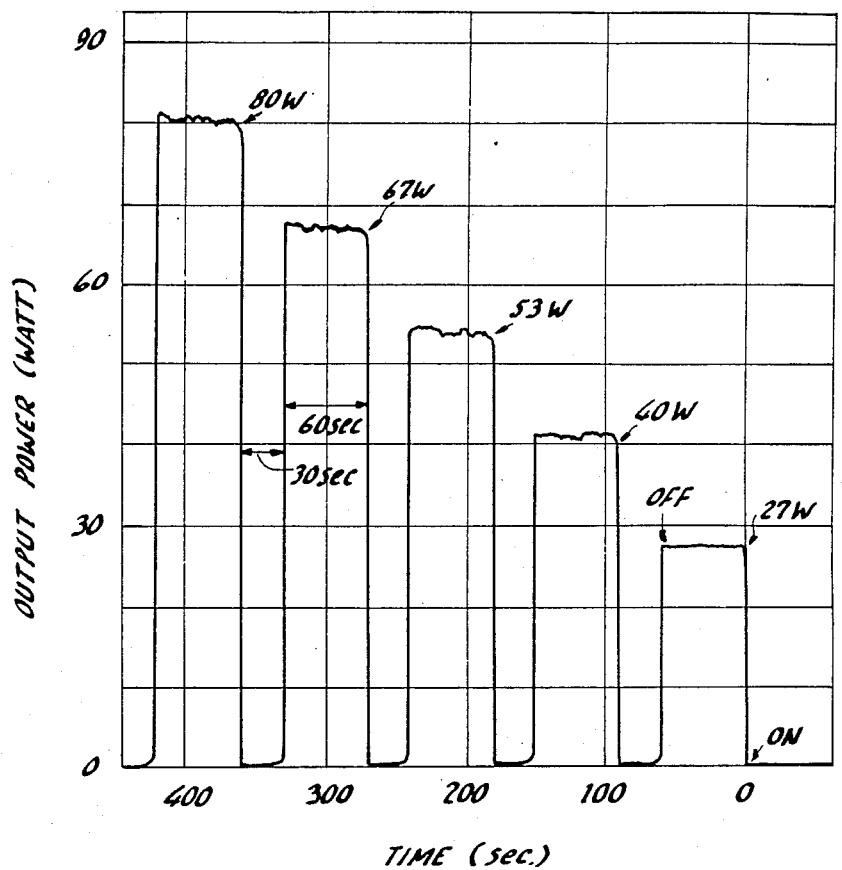

FIG. 6 is a chart showing percent transmissions, experimentally determined and calculated for comparison, of a KRS-5 window, obtained by forming an anti-reflection film of the invention on opposite sides of a KRS-5 substrate, in relation to a wavelength or wave number; and FIG. 7 is a chart of an output laser power obtained after passage through an optical fiber having an anti-reflection film on each end surface thereof when an input power is stepwise changed to a maximum of 85 W.

DETAILED DESCRIPTION AND PREFERRED EMBODIMENTS OF THE INVENTION

The KRS-5 material is, as mentioned before, a mixed crystal of thallium iodide and thallium bromide and has wide utility in optical fields. The KRS-5 material may take various forms including a disc, a plate, a sheet, an optical fiber and the like which are usually used for these purposes.

The anti-reflection film is of the three-layer structure including a first arsenic triselenide layer, a second lead fluoride layer, and a third arsenic triselenide layer for protection of the second layer. These three layers are deposited on surfaces of the KRS-5 substrate in this order through which a laser beam or the like is passed.

Arsenic triselenide is an amorphous glass which has a very small light absorptance, has good adherence to the substrate, and has a high refractive index, n, of 2.8. This arsenic triselenide is first vacuum deposited on a KRS-5 substrate. Subsequently, lead fluoride, which also has a light absorptance and has a relativey low refractive index of 1.67, is formed on the first arsenic triselenide layer. Lead fluoride is less resistant to water and has to be protected by an overcoat. To this end, arsenic triselenide is again vacuum deposited on the second lead fluoride layer as a third layer. Use of the arsenic triselenide is advantageous in that few pinholes are produced upon the vacuum deposition and that the rather poor waterproof of the second layer is fully overcome by the vacuum deposition thereof as the third layer.

The vacuum deposition of these three layers is carried out in any manner known in the art and is particularly described in examples appearing hereinafter.

The thus obtained anti-reflection film of the invention has several advantages over prior art counterparts.

For instance, the film has an absorptance of a carbon dioxide laser beam at a wavelength of 10.6 microns as low as about 0.002%. The film is capable of withstanding the laser beam generated under conditions of an input power of 70 W or more and a power density of 120 $KW/cm^2$. This power transmission capability is greater than a power transmission capability of the KRS-5 in the form of optical fibers.

Moreover, the anti-reflection film is not soluble in water because the second lead fluoride layer, which is rather poor in water-resistant characteristics is completely covered with the third arsenic triselenide which is an amorphous chalcogenide glass, not permitting formation of pinholes in nature when applied by vacuum deposition. By the formation of the film on a KRS-5 substrate or an optical fiber at input and output end surfaces thereof, a reflection loss of about 28% as will be experienced in the substrate or optical fiber free of any anti-reflection film can be beneficially saved.

Figure 1:
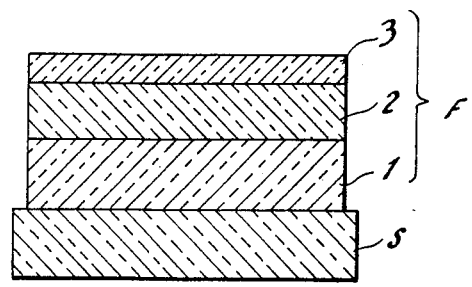
FIG. 1 is a schematic sectional view illustrating a three-layer anti-reflection film for a KRS-5 substrate according to an embodiment of the invention.

Reference is now made particularly to FIG. 1 in which there is shown an embodiment of the invention illustrating an anti-reflection film of the three-layer structure. The film F includes on a super-precisely, optically polished substrate S of the KRS-5 material having a refractive index, $n_s$, of 2.37, a first arsenic triselenide layer 1 having a refractive index, $n_1$, of 2.8. A second lead fluoride layer 2 having a refractive index, $n_2$, of 1.67 is formed on the first layer 1, on which is further formed a third arsenic triselenide layer 3 having a refractive index, $n_3$, of 2.8. In principle, the optical thicknesses of these layers 1 through 3 can be determined according to the Mouchrat equation concerning a three-layer anti-reflection film (Applied Optics, Vol. 16, No. 10, page 2722). The optical thicknesses determined by the equation are 2.524 microns for the first layer 1, 1.719 microns for the second layer 2, and 0.488 microns for the third layer 3, respectively. In the practice of the invention, these optical thicknesses have certain preferable ranges around the above-determined values as will be discussed in detail in the examples. Preferable ranges of the optical thickness are from 2.398 to 2.650 microns for the first arsenic triselenide layer, from 1.633 to 1.805 microns for the second lead fluoride layer, and from 0.464 to 0.513 microns for the third arsenic triselenide layer.

The anti-reflection film of the invention is particularly effective in reducing reflection of a laser beam having a wavelength ranging from 9 to 12 microns.

The present invention is particularly described by way of examples.

EXAMPLE 1

A KRS-5 single crystal disc having a diameter of 25 mm and a thickness of 3 mm and polished on opposite sides thereof was provided as a sample substrate. Subsequently, an anti-reflection film having three layers was deposited on one side of the substrate to obtain an anti-reflection film-bearing substrate as shown in FIG. 1. For the deposition, arsenic triselenide was deposited, as first and third layers in FIG. 1, using a molybdenum crucible having a cover with an antibumping opening under conditions of a substrate temperature of 80° C., an operation pressure of $1.5 \times 10^{-6}$ Torr. and a deposition speed of 12 angstrom/second. Lead fluoride was deposited using a platinum boat under conditions of a substrate temperature of 80° C., an operation pressure of $3 \times 10^{-6}$ Torr. and a deposition speed of 12 angstrom/second. The deposition speed was controlled using a quartz oscillator and a deposition thickness was controlled by means of a transmission-type optical thickness controlling device using an infrared ray having a wavelength of 1.505 microns.

Figure 2:
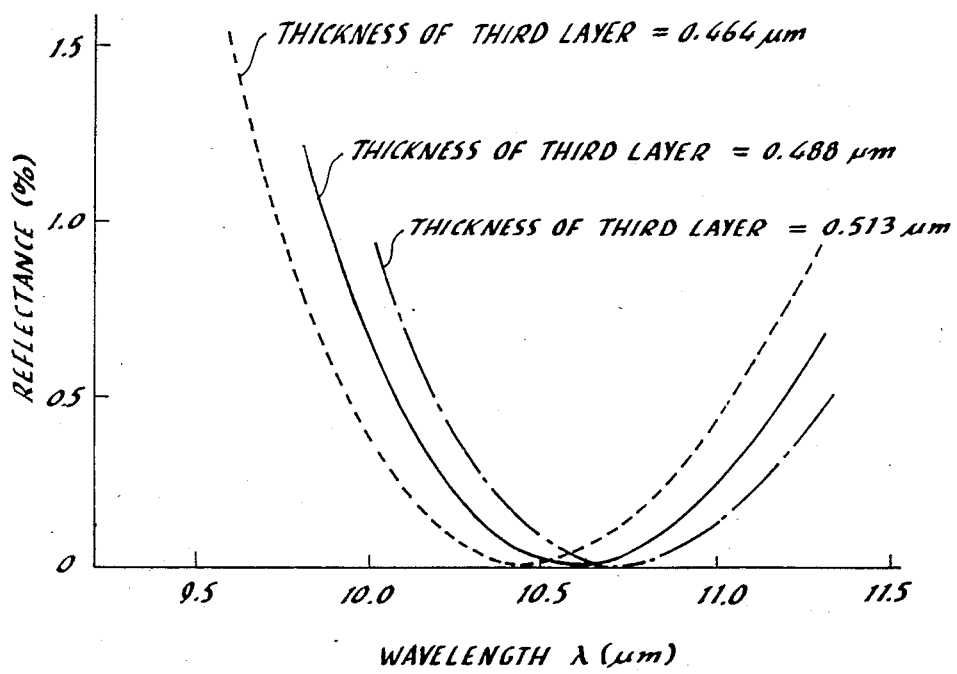
FIG. 2 is a graph showing the relation between the reflectance and the wavelength of a three-layer anti-reflection film of such structure as shown in FIG. 1 in which first $As_2Se_3$ and second $PbF_2$ layers are kept constant with respect to optical thickness while changing the optical thickness of a third $As_2Se_3$ layer by plus and minus 5% from the preset value.

In this example, the first $As_2Se_3$ layer formed directly on the KRS-substrate was controlled to have a constant optical thickness of 2.524 microns and the second $PbF_2$ layer was controlled to have a constant optical thickness of 1.719 microns. The thickness of the third $As_2Se_3$ layer was changed in certain ranges. The resulting samples were subjected to the measurement of reflectance using an IR ray having a wavelength of 10.6 microns. The results are shown in FIG. 2. From the figure, it will be seen that the reflectance at the wavelength is below 0.05% when the optical thickness of the third layer is in the range of from 0.464 to 0.513 microns.

EXAMPLE 2

Figure 3:
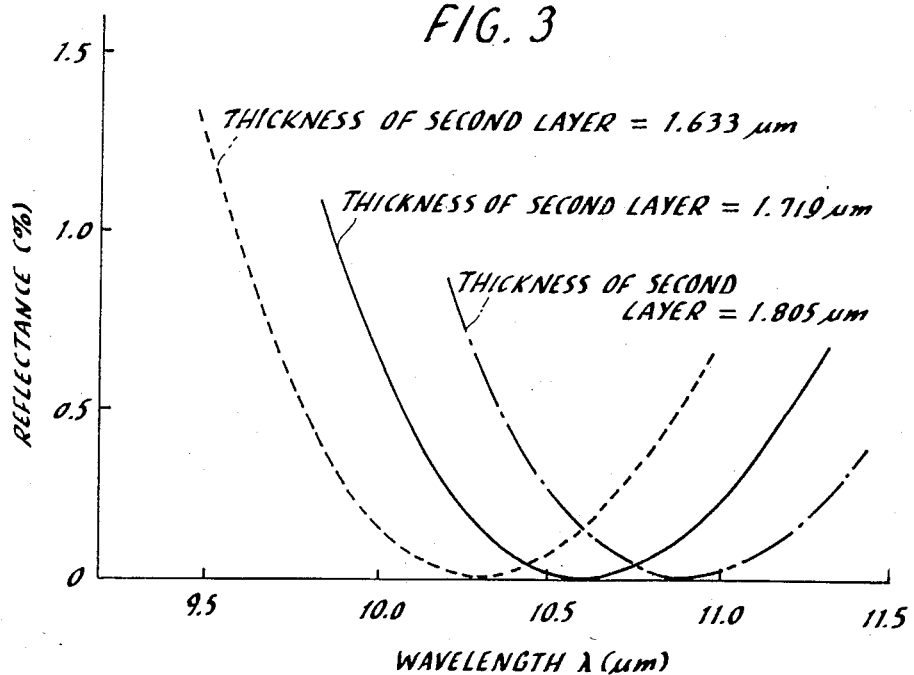
FIG. 3 is similar to FIG. 2 but the optical thickness of the $PbF_2$ layer is changed by plus and minus 5% from the preset value.

The procedure of Example 1 was repeated except that the third $As_2Se_3$ layer was controlled to have a constant thickness of 0.488 microns and the second $PbF_2$ layer was changed in thickness. The results are shown in FIG. 3, revealing that the reflectance at a wavelength of 10.6 microns was in the range below 0.15% when the optical thickness of the $PbF_2$ layer is in the range of from 1.633 to 1.805 microns.

EXAMPLE 3

Figure 4:
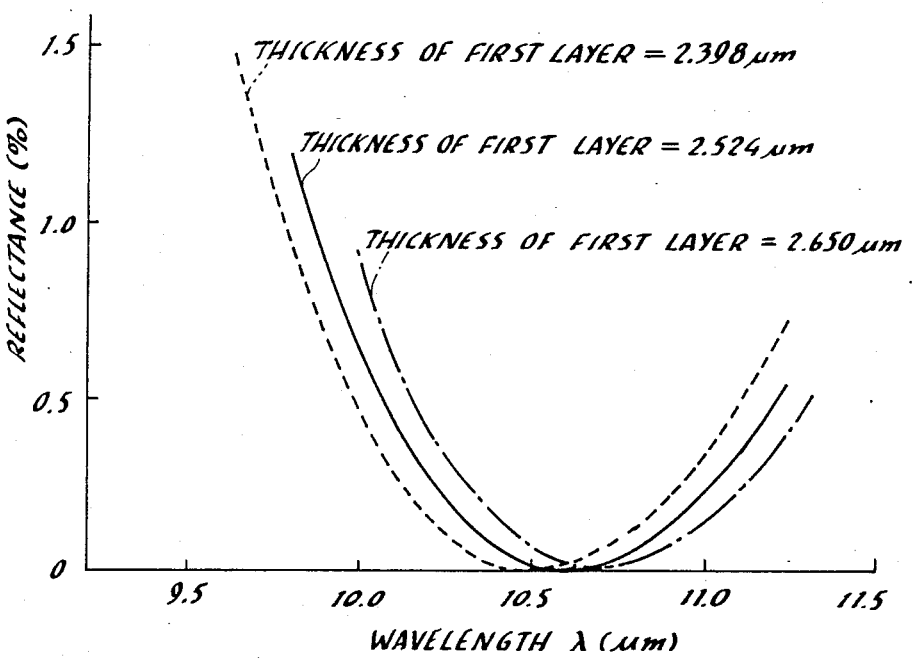
FIG. 4 is similar to FIGS. 2 and 3 but the optical thickness of the first $As_2Se_3$ layer, which contacts with a KRS-5 substrate, is changed by plus and minus 5% from the preset value.

The procedure of Example 1 was repeated except that the second $PbF_2$ layer and the third $As_2Se$ layer had optical thicknesses of 1.719 microns and 0.488 microns, respectively, and the first layer was changed in optical thickness. The test results are shown in FIG. 4, revealing that the reflectance at a wavelength of 10.6 microns is below 0.03% and is thus very close to zero percent when the optical thickness is in the range of 2.398 to 2.650 microns.

EXAMPLE 4

Figure 5:
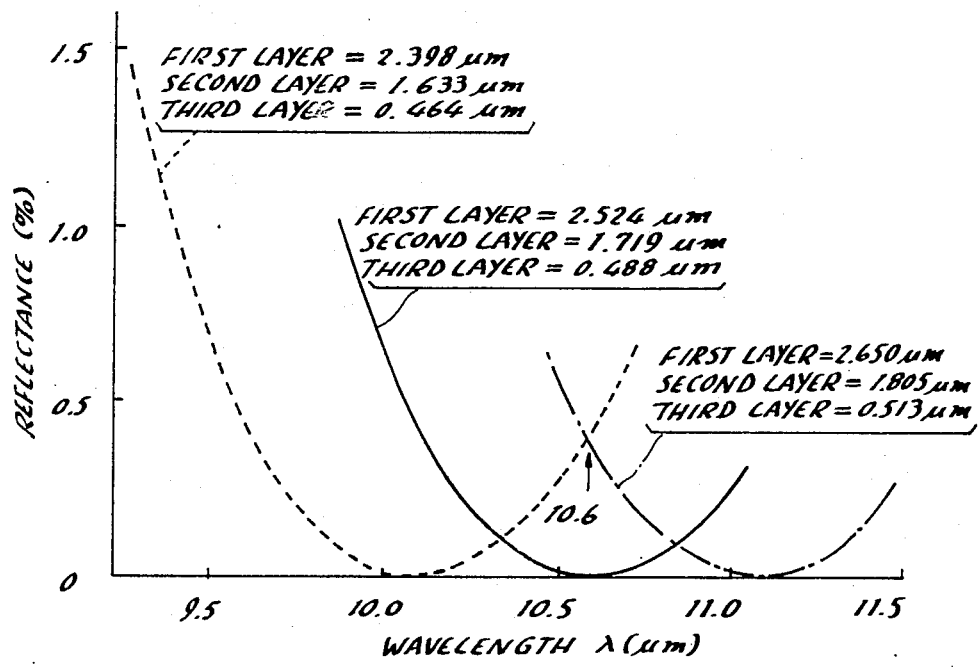
FIG. 5 is similar to FIGS. 2 through 4 but the three layes of the anti-reflection film are, respectively, changed in optical thickness at the same time within ranges of plus and minus 5% from preset values.

The procedure of Example 1 was repeated except that all three layers were simultaneously changed in thickness by increasing or decreasing 5% of the theoretical thickness. The test results are shown in FIG. 5, from which it will be seen that the reflectance at a wavelength of 10.6 microns reaches about 0.04%, resulting in a total reflectance of a substrate having the anti-reflection films on opposite sides of the substrate of about 0.8%. This total reflectance is within a practically allowable range.

From the foregoing examples, it will be appreciated that optical thicknesses of the respective layers for KRS-5 are in ranges of from 2.398 to 2.650 microns for the first $As_2Se_3$ layer, from 1.633 to 1.805 microns for the second $PbF_2$ layer, and from 0.464 to 0.513 microns for the third $As_2Se_3$ layer.

EXAMPLE 5

The general procedure of Example 1 was repeated except that the disc substrate was vacuum deposited with an anti-reflection film on opposite sides thereof. Each film had a first $As_2Se_3$ layer with an optical thickness of 2.547 microns, a second $PbF_2$ layer with an optical thickness of 1.712 microns and a third $As_2Se_3$ layer with an optical thickness of 0.489 micron.

This sample was subjected to the measurement of a percent light transmission spectrum. The results are shown, as dots, in FIG. 6 in which a calculate percent light transmission spectrum is also shown as a solid curve. From the figure, it will be seen that the measured spectrum is well coincident with the calculated spectrum in a wavelength range from 9 to 12 microns.

The above procedure was repeated, thereby obtaining three samples.

The three samples were subjected to the measurement of light absorptance by a laser calorimetric method using a carbon dioxide laser beam with a wavelength of 10.6 microns, with the result of 0.018%, 0.020% and 0.023%. An average of these values was 0.020%. The KRS-5 disc substrates used in this example were found to have absorptances of 0.016%, 0.019% and 0.019% with an average value of 0.018%. From the above results, it will be clear that the absorptance of the anti-reflection films on the opposite sides is as low as about 0.002% in total.

EXAMPLE 6

In this example, a test was conducted on the damage threshold of a three-layer anti-reflection film by irradiation of a laser beam. The laser irradiation damage threshold level is largely dependent on the irradiation conditions of the laser beam, i.e. the relation between the diameter of the laser beam and the size of the sample, the manner of cooling the sample, whether or not the test is effected in air or in vacuum, and the irradiation time. Accordingly, the test was effected as follows.

Two different types of samples were made including a optical window having an anti-reflection film on opposite sides thereof and an optical fiber having an anti-reflection film on opposite end surfaces thereof. The optical window had a diameter of 25 mm and a thickness of 3 mm and the optical fiber had a diameter of 0.5 mm and a length of 100 mm. In each case, the anti-reflection film had a first $As_2Se_3$ layer with an optical thickness of 2.547 microns, a second $PbF_2$ layer with an optical thickness of 1.712 microns, and a third $As_2Se_3$ layer with an optical thickness of 0.489 microns, which were vacuum deposited under conditions similar to those indicated in the foregoing examples. After the vacuum evaporation, all the samples were naturally cooled in air.

Thereafter, the samples were each exposed to a carbon dioxide laser beam in air. The carbon dioxide laser beam used was a 85 W CW single mode carbon dioxide laser beam having a diameter of about 7 mm. This single mode laser beam was focussed by the use of a ZnSe meniscus lens having a diameter of 1 inch and a focal length of 2.5 inches so that the beam had a diameter of 0.27 mm at the focal point. The sample surface was placed at the focal point and irradiated for 1 minute by the laser beam generated at a laser input power of 5 W. Thereafter, the surface was visually observed and if no deterioration took place on the surface, the input power was increased by steps of 5 W until damage or breakage of the surface occurred. The test was carried out up to a maximum input power of 85 W.

The results are summarized as follows.

(1) No changes on the surfaces of the disc sample were observed prior to and after the irradiation to the maximum input power of 85 W. The power density on the sample surface at the maximum input power of 85 W was found to be about 150 KW/cm².

(2) With the optical fiber, the anti-reflection coating was not damaged up to a power lever of 70 W. Some samples remained undamaged up to the maximum level of 85 W. However, at the maximum level, the optical fiber itself was observed as deteriorated. This is particularly shown in FIG. 7, revealing that when the coating surface is irradiated stepwise, the transmitted cw power reached as high as 80 W at least over 60 seconds.

As will be appreciated from the above results, the anti-reflection film of the invention exhibits excellent damage threshold characteristics and can withstand such high input power and power density that the optical fiber was liable to undergo deterioration at that level.

EXAMPLE 7

The procedure of Example 6 was repeated, thereby obtaining the anti-reflection film deposited on the optical fiber on opposite end faces thereof. The optical fiber was immersed in water at the tip thereof for 3 minutes and subsequently dried, followed by subjecting to laser irradiation. Thereafter, the dried optical fiber was exposed to a carbon dioxide laser beam in the same manner as in Example 6, revealing that it could withstand an input power of 70 W and a power density of 120 KW/cm². This gives evidence that the $PbF_2$ layer soluble in water is perfectly protected by the chalcogenide glass layer which was insoluble in water and involved few pinholes.

What is claimed is:

1. A transparent optic comprising a substrate comprising a mixed crystal of thallium iodide and thallium bromide having deposited on surfaces thereof, through which a light beam is passed, an anti-reflective film comprising, deposited on the surfaces, a first arsenic triselenide layer, a second lead fluoride layer and a third arsenic triselenide layer for protection of said second lead fluoride layer arranged on each surface in this order.

2. The transparent optic according to claim 1, wherein the optical thicknesses of the first, second and third layers are in ranges of 2.398 to 2.650 microns, 1.633 to 1.805 microns, and 0.464 to 0.513 microns, respectively.

3. The transparent optic according to claim 1, wherein said substrate is in the form of an optical fiber and said anti-reflection film is deposited on each end surface of said optical fiber.

4. The transparent optic according to claim 1, wherein said substrate is in the form of a disc or lens and said anti-reflection film is deposited on each side thereof.

* * * * *